3,094,155
MICROSYRINGE FOR GAS-CHROMATOGRAPHY
Marco Taramasso and Alberto Guerra, San Donato Milanese, Italy, assignors to Laboratori Riuniti Studi e Ricerche S.p.A., San Donato Milanese, Italy, a company of Italy
Filed Dec. 8, 1960, Ser. No. 74,661
Claims priority, application Italy Dec. 16, 1959
4 Claims. (Cl. 141—329)

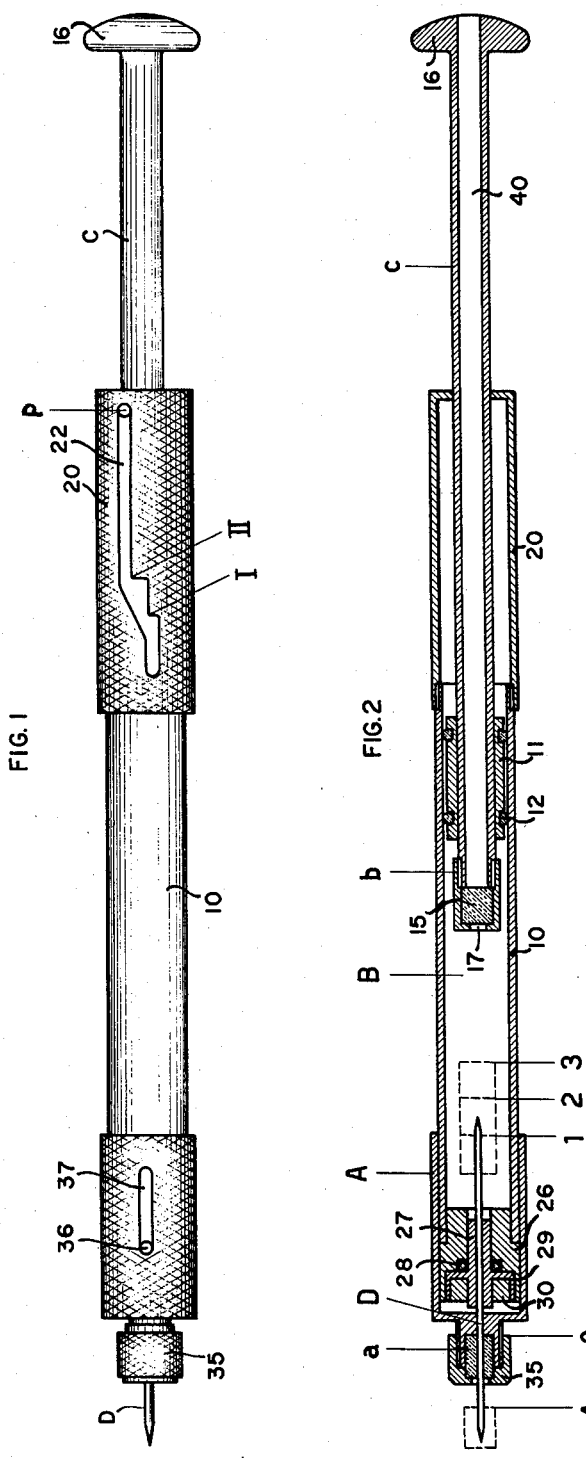

The particular contrivances required in the gas-chromatographic analysis of liquid samples and in particular the necessity of dosing in a reproducible manner very small sample amounts and the rapid introduction thereof into the chromatographic column have considerably increased the search and development work for devices suitable for the purpose.

There are known improved techniques based upon the use of micro-pipettes, micrometer syringes, sealed small glass phials and other even more elaborate systems.

The use of micrometer syringes as is known has been introduced by Ray (Journ. Appln. Chem., January 1954, 4, 21); they represent doubtless the most simple and practical means and do not involve any alteration of the regularity of flow of the vector gas; however they permit only with difficulty a controlled measurement owing to the losses which occur if one operates against systems with sensible pressure. Also the Adass microsyringe is known (Desty, Vapour Phase Chromatography, London 1956, page 386), with which the cited inconveniences are obviated since the liquid in the hypodermic needle is displaced by means of air at a pressure higher than that existing in the chromatographic column. Such a syringe however does not permit the taking out of low-boiling liquids.

It is an object of the present invention to provide a microsyringe, practical, and simple to be handled, particularly adapted for the analysis by means of gaseous chromatography, specially of liquids with low boiling point, or mixtures thereof with high-boiling substances.

Said micro-syringe is provided with a needle the ends of which can be closed by two caps of elastic material in independent manner or simultaneously. The volume of liquid enclosed within the needle can be subsequently displaced by a piston with compressed air as well as with another gas under pressure introduced into the syringe by means of a suitable valve.

A practical embodiment of said micro-syringe, entirely built of stainless steel, is reproduced in the drawing. The needle used with this syringe, which can be of the hypodermic type, is pointed at both ends, and has holes provided laterally, to ensure a better sealing within the closing caps and to make the latter less subject to wear and tear.

The needle in turn is fixed to a washer which allows for its interchangeability, permitting the operator to easily and rapidly replace the needle by others with different capacity.

In the drawing:
FIG. 1 is a side elevation of a syringe made according to one embodiment of this invention; and
FIG. 2 is an axial sectional view of this syringe.

Referring now to the drawing by numerals of reference, 10 denotes the body of the syringe. This is a tube in which there slides a piston 11. The piston carries sealing and guiding rings 12 adjacent opposite ends which engage the inside wall of the tube 10.

Secured to the piston 11 to reciprocate therewith is a tube C which constitutes a plunger. A thimble $b$ is fixedly secured to the inner end of the plunger C. The thimble carries a plug 15 made of a self-sealing resilient plastic material, which seats against the inner end of the plunger C. The opposite end of the plunger C is open and is formed with an integral knob or handle 16. The thimble $b$ has an aperture 17 in its inner end.

Secured to the tube 10 at one end thereof is an externally knurled guide sleeve 20 through which the plunger C slides. The plunger C is connected to the sleeve 20 by a pin P which extends from the plunger C into a slot 22 in the sleeve. This slot is of irregular shape, and is formed with shoulders II and I, whose purpose will appear hereinafter.

Mounted to slide on the tube 10 at the opposite end thereof is an externally knurled supporting member A. Mounted within said opposite end of the tube 10 is a plug 26, which, when in position, serves to plug this opposite end of the tube 10, and serves, also, as a guide on which the part A slides.

The plug 26 may be removably mounted in the tube 10, or may have removably mounted therein a bored holder 27, which may be made of a resilient material, and whose bore is adapted to removably, but grippingly hold a needle D.

The plug 26 and the reciprocable piston 11 together form in the tube 10 a chamber B of variable volume. An O-ring 28, or other suitable sealing means, is disposed in a recess in the plug 26 to surround the holder 27 to prevent escape of gas or liquid from the chamber B through the plug 26.

The holder 27 has an enlarged head 29 at its lower end which may be recessed to receive a ring 30.

The supporting member A is of reduced diameter at its lower end, and is recessed to hold fixedly the resilient plastic sleeve $a$, which is bored to slide on the needle D. The sleeve $a$ is secured in place by an externally knurled cap 35 which may be threaded onto the reduced diameter end of the supporting member A.

The plug 26 has a pin 36 projecting outwardly therefrom. This pin engages in an elongate slot 37 formed in the supporting member A, thereby to limit the movement in opposite directions of the supporting member A on the tube 10.

In use, if the liquid, which is to be tested has a high boiling point, the cavity 40 in the plunger C is filled with the liquid to be tested. The resilient plug 15 closes the lower or inner end of the plunger. The supporting member A is then slid down on the tube 10 until the plug or sleeve $a$ is in the position indicated in dotted lines at 4 in FIG. 2. This closes the outer, lower end of the needle D, which, as stated, preferably has laterally disposed holes or openings at its upper and lower ends. The plunger C is then pressed into the tube 10 as far as it will go. This compresses the air in the chamber B, and forces the resilient plug 15 down over the inner, top end of the needle to the dotted line position shown at 1 in FIG. 2. The needle is thus passed through the resilient, self-sealing plug 15 into the liquid in the chamber 40 of the plunger C, so that the liquid can flow into the needle. To ascertain whether the needle is filled with liquid, the supporting member A can be slid upwardly on the tube 10 to return the sleeve $a$ to the full line position shown in FIG. 2, thus allowing liquid to drip from the needle.

After ascertaining that the needle is full, the supporting member A is again shoved downwardly to return the sleeve $a$ to the dotted line position denoted at 4, so that it seals the lower, outer end of the needle. By drawing the plunger C outwardly until the pin P engages the shoulder I, the plug 15 will be moved to the position denoted in dotted lines at 2 in FIG. 2, thus sealing the upper end of the needle also. The liquid in the needle is thus trapped between the sleeve $a$ in its position 4 and the plug 15 in its position at 2. The microsyringe can now be transported to the chromatographic apparatus.

The microsyringe is forced onto the rubber capsule of the chromatographic apparatus. This causes the part A to slide upon tube 10 permitting the needle D to enter the chromatographic apparatus. The plunger C then is pulled out as far as the second notch or shoulder (II), bringing the plug 15 to the position 3. This frees the openings at both ends of the needle; and then the air previously compressed causes the complete and instantaneous outflow of the liquid from the needle into the chromatographic apparatus.

If the liquid has a low boiling point, instead of filling the plunger C, the needle D may be inserted into a bottle containing the liquid, which is to be analyzed while the sleeve $a$ is in the full line position of FIG. 2 and the plug 15 is in the position denoted in dotted lines at 1 in that figure, the plunger C being pushed into the tube 10 as far as possible. If the bottle has an air-tight stopper made of resilient material, the bottle can be turned upside down, and the needle can be pushed through the stopper to pick up the liquid.

Once the needle has been filled, its two ends are closed by pulling the plunger C out until the pin P seats against the shoulder I, that is, until the plug 15 is in the position $b$, and by moving the supporting member A outwardly on the tube 10 until the sleeve $a$ is in the position shown in dotted lines at 4. The microsyringe can then be transported to the chromatographic apparatus, as before, and the liquid can be transferred from the needle to this apparatus, as before.

The microsyringe of the present invention permits—thanks to its characteristics of construction and operation—analyzing liquids with low boiling point such as butadiene; moreover it permits a better reproducibility of dosage of the chromatographic apparatus. In fact, on the basis of the measurement of the height of the peaks obtained by means of gas chromatography, the following values of the mean error of the individual measurement ($\sigma$) have been obtained: for 2,2,4-trimethyl pentane, $\sigma=0.62\%$; for acetaldehyde, $\sigma=1.6\%$.

We claim:
1. A microsyringe for gas chromatography comprising
   (a) a tube,
   (b) a hollow plunger reciprocable in said tube and projecting outwardly from one end of said tube,
   (c) a self-sealing resilient plug secured to the inner end of said plunger to close the same whereby said plunger may hold a liquid,
   (d) a piston secured to said plunger intermediate the ends of said plunger,
   (e) means closing the other end of said tube,
   (f) a hollow needle removably secured in said means to project at one end inwardly into said tube and to project outwardly at its opposite end beyond said other end of said tube, said needle being open at both ends,
   (g) a supporting member slidable on said tube,
   (h) a sealing sleeve secured to said supporting member to slide on said needle upon movement of said supporting member forwardly and backwardly on said tube, said sealing sleeve, in the forward position of said supporting member, serving to close the outwardly projecting end of said needle, said resilient plug being positioned so that in an intermediate position of movement of said plunger it closes the inwardly projecting end of said needle and so that, in the innermost position of movement of said plunger, said needle extends through said plug into said hollow plunger to permit liquid to flow from said plunger into said needle.

2. A microsyringe as claimed in claim 1, wherein said piston is of greater area than said plug whereby upon movement of said plunger inwardly of said tube, the air in said tube is compressed.

3. A microsyringe as claimed in claim 2, having
   (a) a stop member secured to said tube externally thereof, and
   (b) means secured to said plunger to cooperate with said stop member for precisely positioning said plunger in its intermediate and innermost positions.

4. A microsyringe as claimed in claim 3, wherein said positioning means comprises
   (a) a pin on said plunger and
   (b) an elongate slot in said tube in which said pin is positioned to move as said plunger is reciprocated in said tube, said slot having shoulders in it against which said pin seats to define the intermediate and innermost positions of said plunger.

References Cited in the file of this patent
UNITED STATES PATENTS

| | | |
|---|---|---|
| 2,707,466 | Hoskins et al. | May 3, 1955 |
| 2,708,438 | Cohen | May 17, 1955 |